United States Patent [19]
Walker et al.

[11] Patent Number: 5,198,907
[45] Date of Patent: Mar. 30, 1993

[54] METHOD AND APPRATUS FOR AUTOMATICALLY LOCATING PREDEFINED EXPOSURE AREAS IN A SCANNED IMAGE

[75] Inventors: Keith A. Walker, Rochester; Donald A. Koop, Hamlin, both of N.Y.

[73] Assignee: Eastman Kodak Company, Rochester, N.Y.

[21] Appl. No.: 749,028

[22] Filed: Aug. 23, 1991

[51] Int. Cl.$^5$ .......................... H04N 1/23; H04N 1/38
[52] U.S. Cl. ...................................... 358/296; 358/406; 358/449; 358/453; 358/464; 395/117
[58] Field of Search ............... 358/296, 406, 449, 451, 358/452, 453, 488, 464; 395/117

[56] References Cited

U.S. PATENT DOCUMENTS

| | | | |
|---|---|---|---|
| 4,471,386 | 9/1984 | Tuhro | 358/453 |
| 4,777,515 | 10/1988 | Aikoh . | |
| 4,933,778 | 6/1990 | Tufano | 358/488 |
| 5,033,102 | 7/1991 | Nakajima | 358/453 |

OTHER PUBLICATIONS

Kodak Color Reproduction Guides, User's Guide, Q-60 (copyright, 1988), including front cover, inside jacket, pp. 2, 16-20, 30-32, back cover.
Input Color Calibration Software User's Guide, Kodak Electronic Printing Systems, Inc. (copyright May, 1991.

Primary Examiner—Benjamin R. Fuller
Assistant Examiner—Scott A. Rogers
Attorney, Agent, or Firm—David M. Woods

[57] ABSTRACT

Exposure areas in a calibration original are automatically found by reference to a registration mark having a predetermined dimensional orientation relative to the exposure areas. A scanner produces image signals representative of both the exposure areas and the registration mark. A pattern recognition module employs edge detection to distinguish image signals corresponding to the registration mark. Two-dimensional Cartesian coordinates are then extracted from the registration mark and used to further distinguish image signals corresponding to the exposure areas, thereby locating exposure areas although the original may not be properly aligned in the scanner. A preferred registration mark is a pair of orthogonal, intersecting guide bars. By further defining the nominal length of the guide bars, the size of the mark can be established and the exposure areas can be located despite dimensional changes due to magnification error in the scanner.

12 Claims, 4 Drawing Sheets

METHOD AND APPRATUS FOR AUTOMATICALLY LOCATING PREDEFINED EXPOSURE AREAS IN A SCANNED IMAGE

BACKGROUND OF THE INVENTION

1. Field of the Invention

The invention relates to the automatic recognition of image areas on an image-bearing original and, more particularly, to the automatic location of areas of exposure on an original for the purpose of calibrating an image scanner.

2. Background Art

It is known to record specific patterns on film for subsequent recognition by devices that classify image data or archive data, e.g., for a database supporting storage on microfilm. For example, in U.S. Pat. Nos. 4,691,112 and 4,283,621 a microfilm information system uses "blip" marks on a film support to locate microfilm document images for subsequent processing, e.g., such as archival and retrieval by a data processing system. Such "blip" marks can be shaped longer than average, as disclosed in U.S. Pat. No. 3,981,582, to form a command signal causing the system to undertake some function, e.g., to cut the film. Similarly, as disclosed in U.S. Pat. No. 4,777,515, the mark may have a length which corresponds to the size of the original that it references.

U.S. Pat. No. 3,266,393 describes a method for impinging, with accuracy, marks on film which would aid in the secondary appraisal of the exposure area of interest. The utility of this method includes the evaluation of aircraft reconnaisance photographs and applications related to photographic mapping. Another patent, U.S. Pat. No. 4,583,831, describes a technique for providing evenly spaced spot exposure of various code fiducials in binary form on a film. This would provide a means for further identification of an exposed area on the processed negative or positive. In the case where orientation of the image is important relative to its interpretation, U.S. Pat. No. 4,097,879 discloses a method of film exposure employing a mechanism within a camera body for indicating the top and bottom of the pictures -photographed, and accordingly exposing a U-shaped orientation mark on the film. The exposure information remaining in the field of view may then be interpreted as the top or bottom of the original scene depending upon the orientation of the U-shaped mark.

Generally, in the foregoing systems of the prior art, the exposure information contained in the overall image is not specifically used in operating the scanner. That is, once located, the exposure information will not be further utilized by the scanner itself, other than to properly categorize or direct the scanned information for subsequent processing. In photographic printing applications, as disclosed in U.S. Pat. No. 4,211,558, it is known to expose a density wedge nearby the image and then have the printer use the wedge for density and/or color corrections. However, in the '558 patent, no effort is made to precisely register the wedge. In electronic systems where certain exposure information is used by the scanner device itself, e.g., to calibrate its scanning components, it is imperative that the exposure information be accurately located and accurately detected. Particularly where the exposure information comprises many individual "patches" of separate information, and the input information is subject to angular orientation and magnification errors, present registration techniques do not provide sufficient accuracy in the location of the image points corresponding to the exposure areas.

SUMMARY OF THE INVENTION

An object of the invention is to provide a scanner that automatically locates data corresponding to specific points in an image scanned from an original.

Another object of the invention is to accurately locate data even though the original has not been properly aligned in the scanner.

Another object of the invention is to accurately locate data even though the original is subject to an error in magnification.

Another object of the invention is to automatically locate data representative of exposure information in order to calibrate the scanner.

These objectives are realized by an image scanner that scans an original and generates image signals for both a primary image and a registration mark having a predetermined dimensional orientation relative to the primary image. A pattern recognition module operates upon the image signals, distinguishing signals corresponding to the registration mark and extracting directional coordinates from the dimensional orientation of the registration mark. In response to the directional coordinates, image signals corresponding to the primary image are located, and the primary image is automatically located even though the original is improperly aligned in the scanner.

In further definition of the invention, the registration mark has a predetermined size relative to the primary image such that length information is extracted and utilized by the scanner to distinguish image signals corresponding to the primary image, even though the original is improperly magnified by the scanner. In the specific embodiment, the registration mark is a pair of orthogonal, intersecting guide bars of nominal lengths defining a coordinate reference for the primary image.

BRIEF DESCRIPTION OF THE DRAWINGS

The invention will be described in relation to the drawings, in which.

DESCRIPTION OF THE PREFERRED EMBODIMENT

Figure 1:
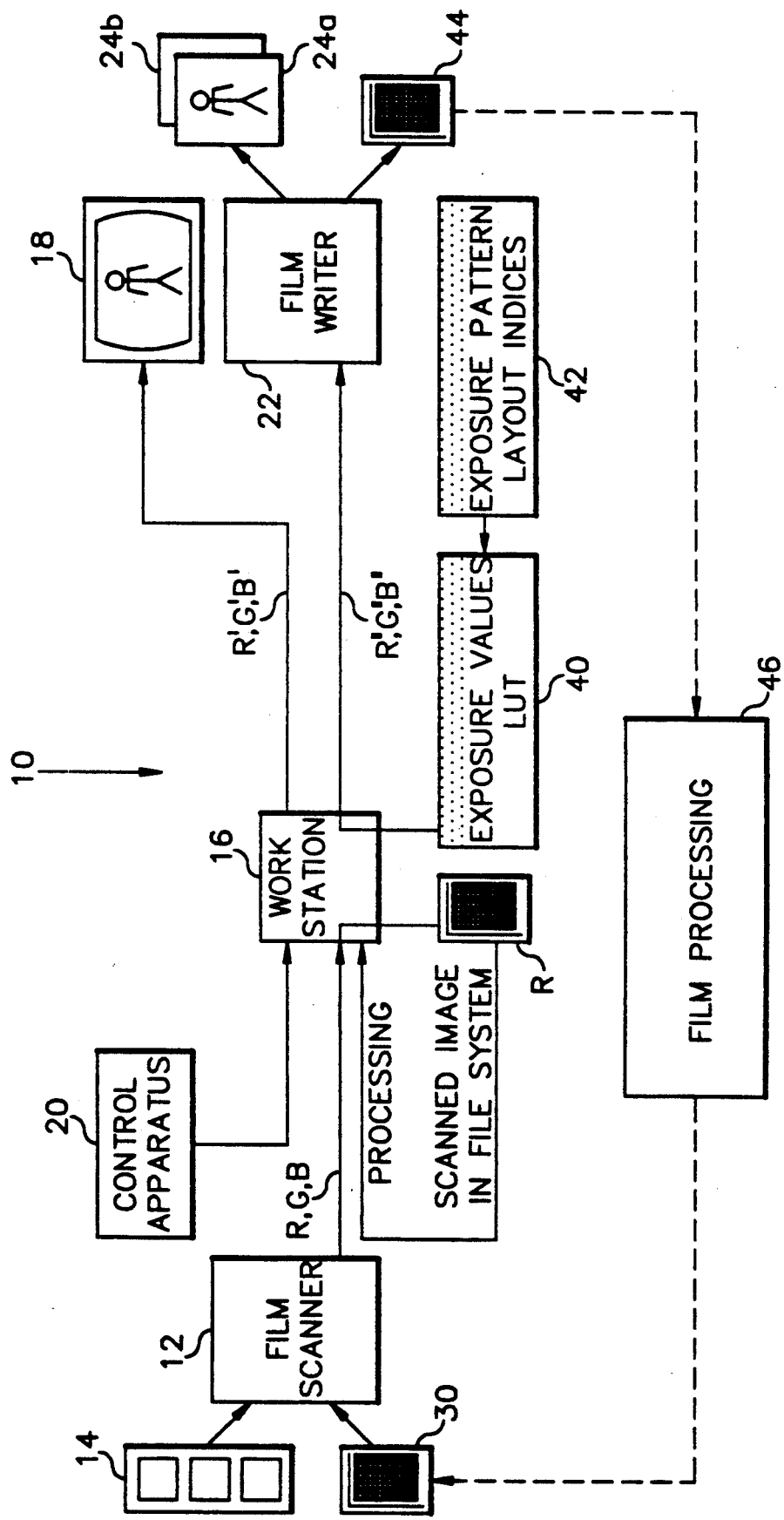
FIG. 1 is a block diagram of an image scanning apparatus utilizing an image location technique in accordance with a preferred embodiment of the invention.

FIG. 1 shows in block diagram form, an image scanning apparatus 10 in accordance with a preferred embodiment of the invention. An operator electronically edits the color and composition of an original photographic image to produce an aesthetically modified image, referred to hereinafter as a "reproduced image". To that end, an image scanner 12 serves for scanning an original image on a photographic input film 14 and for producing red (R), green (G) and blue (B) image-bearing signals in digital form. A computer-based workstation 16, which receives the image-bearing signals from the scanner 12, enables the operator to modify (color and/or composition) the original image to construct the reproduced image. For that purpose, a video monitor 18 serves to display an image corresponding to an image-bearing signal provided by the workstation 16. Control apparatus 20, including a keyboard and a cursor, enables the operator to provide image manipulation commands pertinent to modifying the displayed video image.

The image scanning apparatus 10 provides an electronic retouching and photocomposition capability to users including commercial photographic laboratories and retouchers. To meet user needs, the scanner 12 is capable of digitizing an image from a negative film, such as KODAK VERICOLOR III Film manufactured by Eastman Kodak Company, or a reversal film, such as KODAK EKTACHROME Film or KODACHROME Film. Further towards meeting user needs, the scanner 12 receives negative or reversal film of various size ranging from 135 format to a sheet of approximately 20 centimeters (cm) by 25 cm.

The image scanning apparatus 10 is further capable of forming a hard copy reproduction of the soft copy displayed on any of a variety of image-receptive output media. To that end, a film writer 22, in response to the workstation 16 supplying an R"G"B" signal corresponding to a final reproduced image, then writes the reproduced image onto either an output film 24a of the reversal type or an output film 24b of the negative type. The aforementioned KODAK VERICOLOR III Film serves as a suitable negative film 24b and KODAK EKTACHROME 100 Film as a reversal film 24a. If a negative film is exposed, a further printer (not shown) produces a positive hard copy of the reproduced image, preferably by optically printing the negative onto a print material. KODAK EKTACOLOR PLUS Paper, KODAK EKTACOLOR Professional Paper, and KODAK DURATRANS Display Material are preferred print material.

The invention pertains to the automatic location of exposure information on a reference original in order to calibrate the scanning apparatus shown in FIG. 1. The invention relates two distinct areas of exposure on a single piece of film. The first area of exposure, hereinafter referred to as a registration mark, consists of a pair of guide bars, distinguishable in the image, by the amount of exposure used to create the bars relative to the amount of exposure in the background of the image. The guide bars are used for gaining precise access to a second area of exposure, hereinafter referred to as a primary image, which provides information pertinent to the calibration of the scanning system 10. While guide bars are described, it should be apparent that any mark having a two dimensional orientation may be used, as long as directional coordinates can be extracted, in particular from any two coordinates capable of locating points on the original and measuring their distances from either of two intersecting axes along lines parallel to the other axis. While the preferred embodiment shows well-known Cartesian coordinates, there is no implication that the axes must be orthogonal. For example, two series of dots arrayed at, say, 60° could serve as a registration mark.

Figure 2:
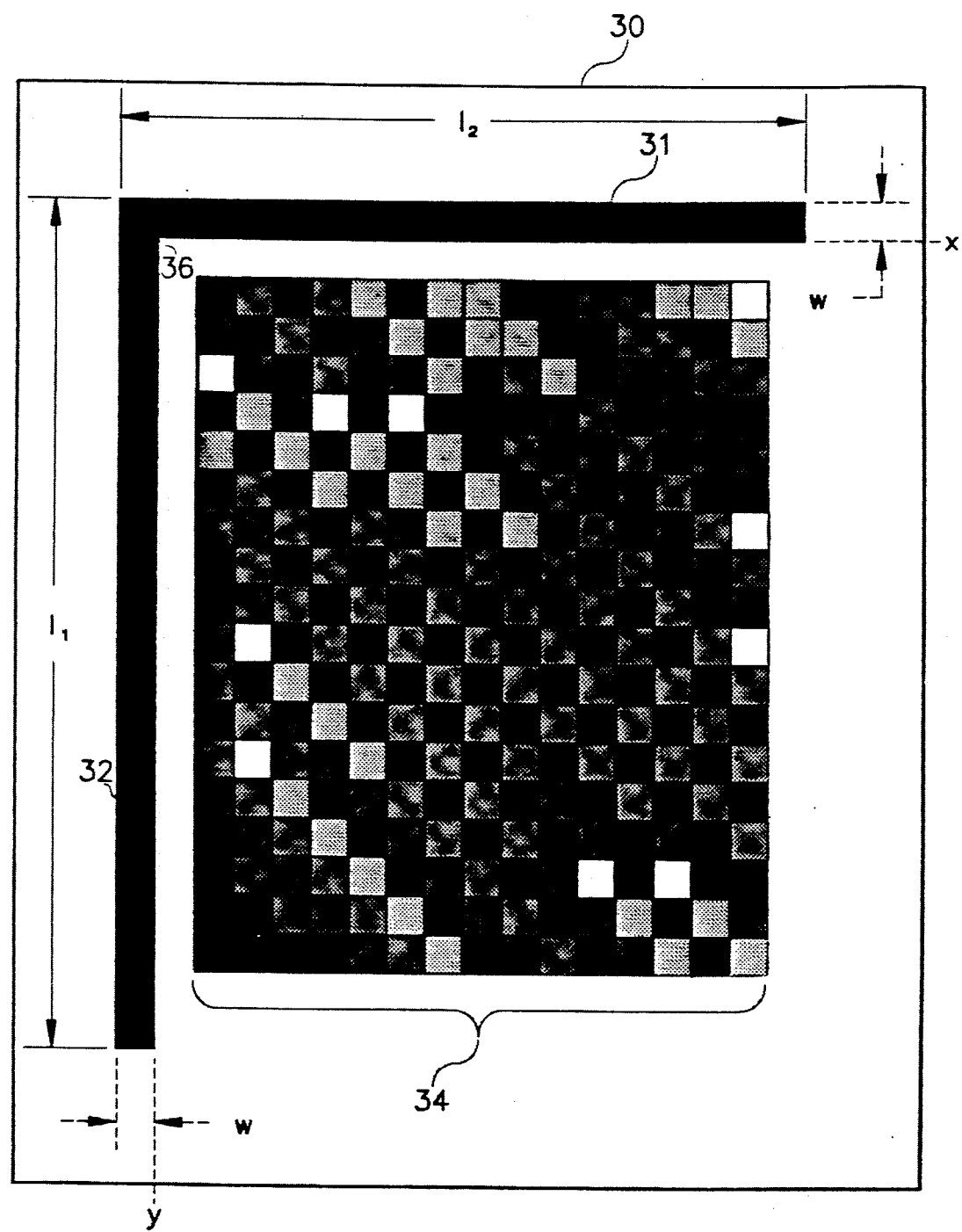
FIG. 2 illustrates a preferred embodiment of a reference original showing the registration mark and the exposure areas useful in calibrating the image scanning apparatus shown in FIG. 1.

FIG. 2 illustrates a preferred embodiment of a reference original 30, where the registration mark comprises two guide bars 31, 32 that are juxtaposed to a second area of exposure, the primary image 34, consisting of a "quilt" pattern of various individual exposure levels. Each exposure level is useful in calibrating the input and/or output of the scanning apparatus 10. The inside edges of the guide bars intersect at a location 36, which will be referred to as the "point of origin", to form a set of Cartesian coordinates x, y (which are extrapolated as broken lines x, y from the guide bars 31, 32). The length $l_1, l_2$, of the guide bars are pertinent to the identification of the image area, and in particular, to compensation for the rotational and electro-optical deficiencies of the film writing and scanning devices, that is, for errors in alignment and magnification of the reference original.

Referring again to FIG. 1, a reference image R is generated electronically from a set of exposure values in an exposure look-up table (LUT) 40 which are arranged into a "quilt" pattern by layout indices stored in a layout memory 42. The electrical signals representative of the reference image R are generated by the workstation 16 and applied to the film writer 22, which accordingly exposes a film 44 with the "quilt38 arrangement of exposure values as shown in FIG. 2. The film 44 is conventionally developed in a film processing operation 46 into a processed film transparency which becomes the reference original 30 for the system. Calibration is effected by scanning the film transparency 30 with the film scanner 12. Various transmittance parameters are thereby obtained and used to calibrate the scanning device in the film scanner 12 and/or the exposing device in the film writer 22. The calibration process itself forms no part of the invention and therefore will not be further described.

Figure 4:
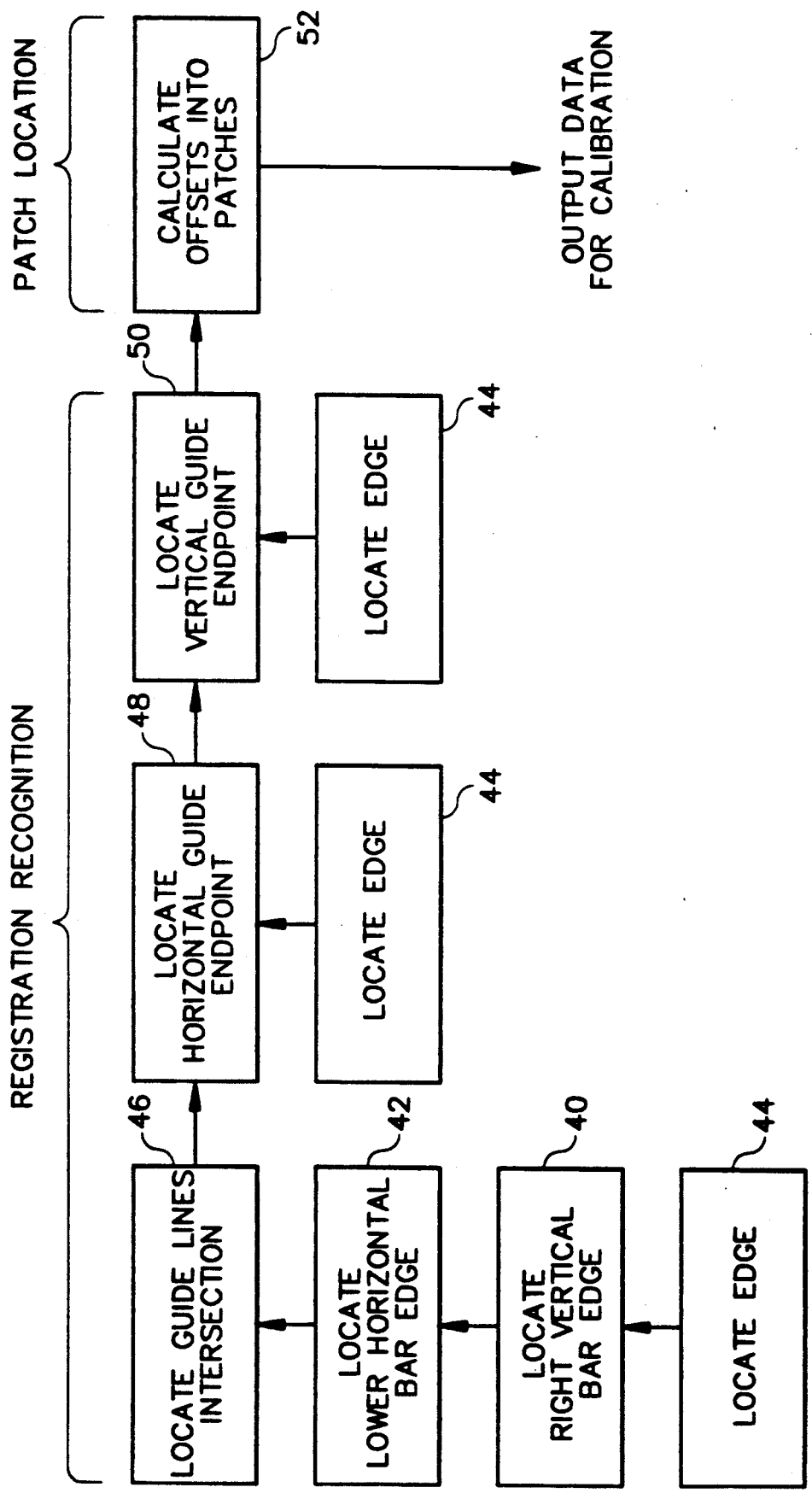
FIG. 4 is a data flow diagram of the algorithm used for recognizing the registration mark, and locating the exposure areas, shown in FIGS. 3 and 4.

The work station 16 employs an algorithm as shown in FIG. 4 for recognizing the registration mark and locating the exposure areas or "patches". The process is to determine the intersection of the guide bars 30, 32, that is, to find the point of origin 36, and then to locate the endpoint of each bar. From this information, a two dimensional coordinate system, i.e. a frame of reference, can be constructed. In general, any image on film can be considered to be within a two dimensional frame of reference. Given a relative starting coordinate for this frame of reference, a search for distinguishable areas of exposure, i.e. an object in the image, begins along either coordinate axis in the direction in which significant differences in exposure are expected. Depending on the nature of the object being searched for, predetermined parameters can adequately describe the space of this object within the spatial reference system.

The parameters necessary for object recognition are size and boundary determination. Size is given in relation to the system of reference being used, i.e., in density or transmittance numbers relative to specific coordinates. Boundary recognition (edge detection) is determined by a difference in exposure over a contiguous area. This boundary can then be followed in a given direction until the exposure differential falls below the specified limit. In this sense, a line is drawn and the rotation of this object is known relative to the axes within the coordinate system.

When the known size of the object (i.e., the registration mark) is given as a parameter, the scanning magnification error can also be obtained. The magnification error is calculated as the percentage of the size of the discovered object to the size of the original object. This percentage is then applied in any calculation when searching for successive objects (i.e., exposure areas) in the scanned image. Once a recognizable object (i.e., the registration mark) of known size and relative location within an image is distinguished by the scanning apparatus 10, any other area of exposure (i.e., the primary image 34) related meaningfully to the known object can be evaluated automatically.

More specifically, to determine the point of origin 36 of a Cartesian coordinate system, a pattern recognition search is begun from the upper left corner of the image. The search is begun from the top of the image in a downward direction along the y-axis (vertical guide bar 32) and along the x-axis (horizontal guide bar 31) in a positive direction to the right. Differences in exposure between adjacent pixels are used to define an edge in accordance with an edge location routine. This edge determination can be made adjustable based upon the exposure characteristics of the image.

The edge location routine incorporates the notion of a tolerance and a resolution in its adjustable scheme of edge detection. The tolerance defines how many pixels of a given exposure must be present to delineate an edge. The resolution is the exposure difference required between two pixels, but not necessarily adjacent pixels, to determine how well defined the edge must be in order to be called an edge. When the tolerance and resolution requirements have been met satisfactorily in any portion of the image, then the edge location routine will recognize this location as a point along an edge.

In order to recognize the guide bars 31, 32, the inner (or outer) edges of the bars must be continuous in an expected direction for an expected length. If both edges are detected, the separation of the edges (width w, FIG. 2) can be checked against an expected width. Once the point of origin 36 has been identified, the expected direction of the guide bar, appearing in the horizontal orientation, is to be continuous along the x-axis in a positive direction and the expected direction of the guide bar, appearing in a vertical orientation, is to be continuous along the y-axis in a downward direction. Therefore, if the detected edges are discontinuous, or do not extend in the expected directions, then it can be recognized that an inappropriate or improper orientation of the expected image is being viewed by the software. When the edges of the guide bars are followed in either the expected or discontinuous directions for the predefined dimensions of those bars, then the image is identified and can be used for further analysis.

Since the dimensions of the guide bars are predefined, this will provide the necessary information to account for dimensional inaccuracies in the reproduction of the exposure area of interest. By calculating a rotational component and a magnification component, the software applies these corrections to the dimensions of the exposure area of applicable value.

FIG. 4 shows the data flow diagram of the algorithm implemented by the workstation 16 for recognizing the registration mark and locating the exposure patches. Each illustrated module utilizes image pixel data stored by the scanner in raster-based coordinates. Since these coordinates ordinarily do not reference the exposure areas correctly because of alignment and magnification error, the algorithm generally proceeds to map the raster-based coordinates into corrected coordinates based on the location of the guide bars 31, 32. A "locate edge" module 44 is called up as necessary to determine an edge within the image pixel data. Given the axis, horizontal or vertical, along which to look for an edge, and the direction to move along the axis, either up or down, or right or left, the "locate edge" module 44 finds an edge which falls within the allowable range of an edge, given the aforementioned tolerance and resolution parameters.

A "locate right vertical bar edge" module 40 then searches through rows of image pixel data from left to right, and from top to bottom, to detect the right edge of the vertical bar 32. The module 40 obtains the right edge by first finding the left edge and comparing the distance therebetween to the expected bar width w (FIG. 2). Likewise, a "locate lower horizontal bar edge" module 42 then searches from left to right and vertically from top to bottom through the image pixel data looking for upper and lower edges in order to distinguish the bottom edge of the horizontal guide bar 31. A "locate guide lines intersection" module 46 uses the edge determination data returned by modules 40, 42 to identify the intersecting point of the inside edges of the horizontal and vertical guide bars 31, 32 on the reference original. When found, the corresponding x, y coordinate is designated as the point of origin 36. The endpoints of the guide bars 31, 32 are then found by a "locate horizontal guide endpoint" module 48 and a "locate vertical guide endpoint" module 50. Where the differences between the endpoints and the origin 36 are not as expected, a magnification error is recognized and a rotational component is calculated and special offsets are calculated to account for these errors.

At this stage, the orientation and size of the guide bars 31, 32 is determined, and the known positions of the individual exposure patches in the primary image 34 relative to the guide bars 31, 32 can be located by offsetting from the point of origin 36. More specifically, an offset module 52 is used to determine the position of the patches along the x-axis (horizontal guide bar 31) and y-axis (vertical guide bar 32). Given the patch locations, data included within the patches is available for further use by the scanning apparatus 10 in calibrating the film scanner 12 and/or the film writer 22. The special positive or negative offsets are also combined with the known offsets to correct for rotational misalignment and magnification (size) error. Each module 40-54 is conventionally programmed according to the system parameters heretofore specified.

Figure 3:
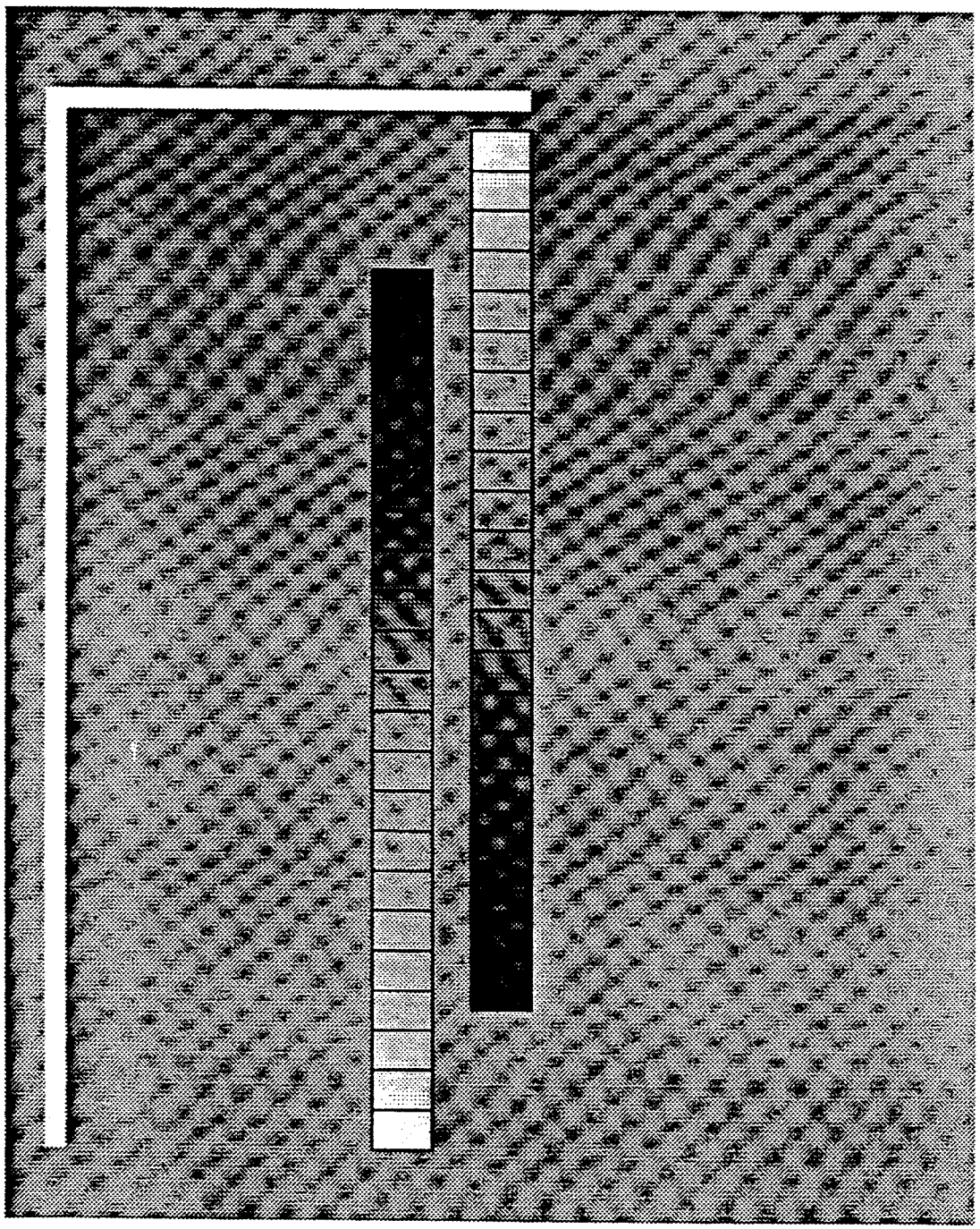
FIG. 3 illustrates an alternative embodiment of a original.

The invention has been described in detail with particular reference to preferred embodiments thereof, but it will be understood that variations and modifications can be effected within the spirit and the scope of the invention. The reference original, for example, may be either a positive (as in FIG. 2) or a negative original. In addition, various types of exposure "patch" patterns may be implemented. For instance, FIG. 3 shows a negative original incorporating two conventional density wedges.

What is claimed is:

1. Image scanning apparatus for generating image signals from an original, the original including a primary image composed of a plurality of exposure patches and a registration mark comprised of two parts having a predetermined two-dimensional intersecting orientation relative to the primary image, said apparatus comprising:

means for scanning the original, including both the primary image and the registration mark, and for generating image signals representative of both the primary image and the registration mark;

recognition means operative upon the image signals for distinguishing image signals corresponding to the registration mark, said recognition means further extracting directional coordinates from the dimensional orientation of the parts of the registration mark, thereby defining a two-dimensional coordinate reference for the primary image; and location means responsive to said directional coordinates for distinguishing image signals corresponding to the exposure patches of the primary image based on their predetermined two-dimensional orientation relative to the coordinate reference, whereby the primary image is automatically located on the original even through the original has not been properly aligned in the scanning apparatus.

2. Image scanning apparatus as claimed in claim 1 wherein the registration mark has a predetermined size relative to the primary image and said recognition means further extracts length information from the size of the registration mark and said location means is responsive to said length information for distinguishing image signals corresponding to the primary image, whereby the primary image is automatically located on the original even though the original has been erroneously magnified in the scanning apparatus.

3. Image scanning apparatus as claimed in claim 1 further including means for processing the image signals corresponding to the primary image whereby the processed signals are used to adjust an operating condition of the image scanning apparatus.

4. Image scanning apparatus as claimed in claim 3 wherein the primary image represents reference signal information and said processing means utilizes the reference signal information to calibrate the image scanning apparatus.

5. Image scanning apparatus as claimed in claim 1 wherein the registration mark is a pair of orthogonal, intersecting guide bars of nominal lengths.

6. Image scanning apparatus as claimed in claim 5 wherein said recognition means locates an edge of each of the guide bars, and further locates the coordinates of the intersection of the guide bar edges.

7. Image scanning apparatus as claimed in claim 6 wherein said location means distinguishes the primary image by offsetting from the intersection coordinates by a predetermined amount.

8. Image scanning apparatus as claimed in claim 6 wherein said recognition means distinguishes actual lengths of said guide bars on the original and said location means is responsive to the actual lengths of the guide bars, in relation to their nominal lengths, to compensate for errors in magnification encountered in scanning the original.

9. Image scanning apparatus as claimed in claim 8 wherein said recognition means distinguishes actual lengths by detecting endpoints of the guide bars and comparing the endpoints to the intersection coordinates.

10. A method for locating image data corresponding to one or more specific image areas in an original, said method comprising the steps of:
providing an image-bearing original having a primary image composed of a plurality of specific image areas, and a registration mark having a predetermined two-dimensional intersecting orientation relative to the specific image areas;
scanning the image-bearing original, including the specific image areas an the registration mark, and generating scan signals therefrom;
analyzing the scan signals for signal transitions representative of the registration mark;
extracting two-dimensional coordinate information from the scan signals corresponding to the registration mark; and
utilizing the two-dimensional coordinate information to locate the specific image areas.

11. The method as claimed in claim 10 further including the step of processing the scan signals corresponding to the specific image areas.

12. The method as claimed in claim 10 wherein the registration mark has a predetermined size relative to the primary image, said method further including the step of extracting size information from dimensional characteristics of the registration mark and utilizing the size information to adjust for changes in magnification.

* * * * *